(12) United States Patent
Hubbard

(10) Patent No.: US 8,307,838 B1
(45) Date of Patent: Nov. 13, 2012

(54) SELF-OPERATING WINDSHIELD WIPING APPARATUS AND ASSOCIATED METHOD

(76) Inventor: Jeffrey Hubbard, Los Angeles, CA (US)

( * ) Notice: Subject to any disclaimer, the term of this patent is extended or adjusted under 35 U.S.C. 154(b) by 406 days.

(21) Appl. No.: 12/570,735

(22) Filed: Sep. 30, 2009

(51) Int. Cl.
*B08B 3/00* (2006.01)

(52) U.S. Cl. ............................................. 134/93; 15/103

(58) Field of Classification Search .................. None
See application file for complete search history.

(56) References Cited

U.S. PATENT DOCUMENTS

| | | | |
|---|---|---|---|
| 2,306,980 A | 12/1942 | Roberts | |
| 3,152,832 A * | 10/1964 | Kamp | 296/95.1 |
| 4,316,303 A | 2/1982 | Penn | |
| 5,274,876 A * | 1/1994 | Wehrspann | 15/250.17 |
| 6,324,719 B1 | 12/2001 | Ritacco | |

* cited by examiner

*Primary Examiner* — Eric Golightly

(57) ABSTRACT

A self-operating windshield wiping apparatus for cleaning a window includes a portable housing having a cavity, and a curvilinear guide track formed in an outermost wall thereof. A suction cup is eccentrically positioned within the cavity and partially extends outwardly from the open bottom end for removably securing the portable housing to a support surface. A handle is rotatably mated to the portable housing and reciprocated along the curvilinear guide track, a rotating cam situated within the portable housing and mated to the handle, and a motor communicatively mated to the rotating cam. Such a motor causes the rotating cam to rotate along a circular travel path within the cavity. A wiper blade section is coupled to a distal end of the handle and simultaneously reciprocated with the handle along a first arcuate path as the rotating cam is revolved along the circular travel path.

12 Claims, 6 Drawing Sheets

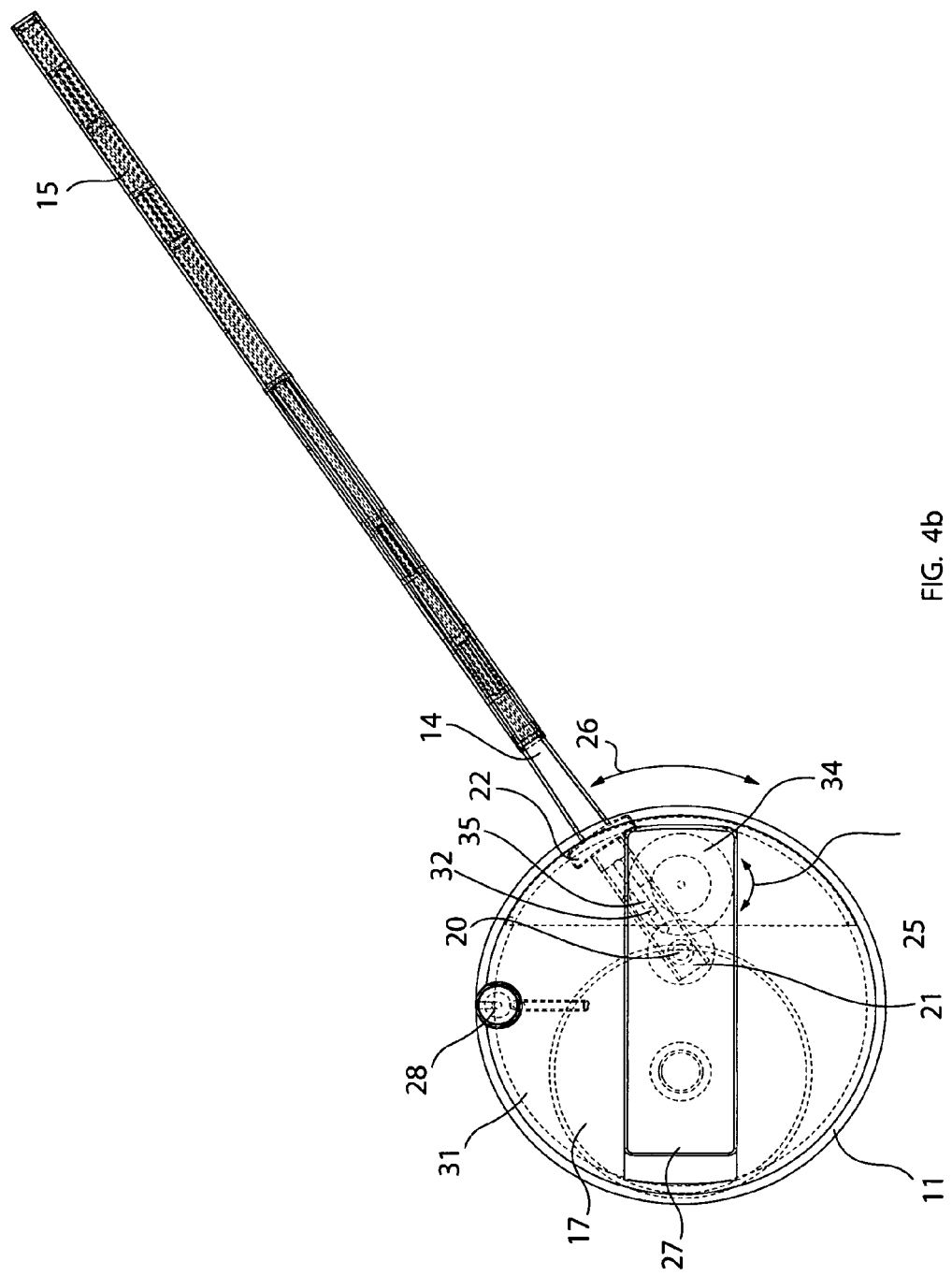

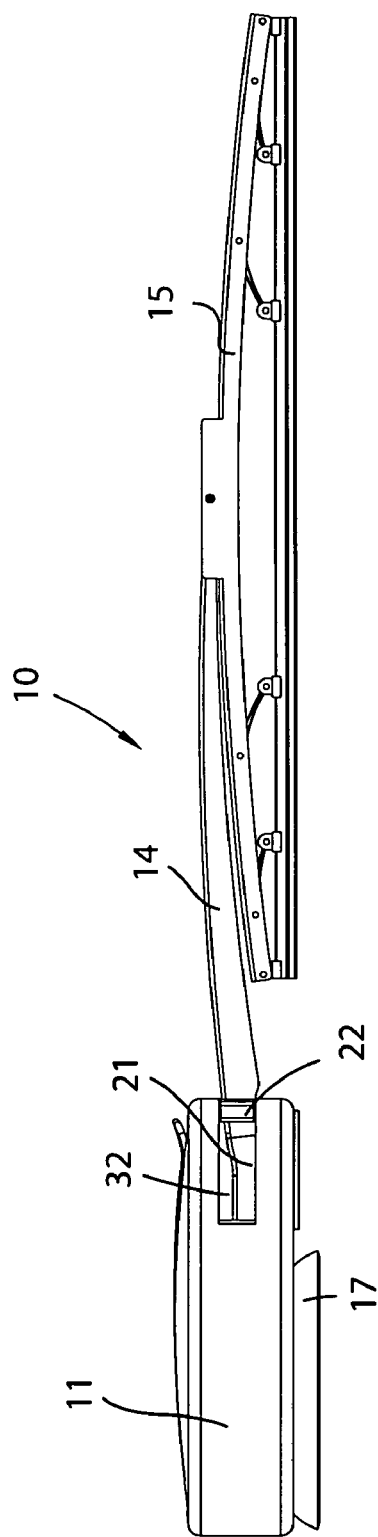
FIG. 5
FIG. 6
FIG. 7

SELF-OPERATING WINDSHIELD WIPING APPARATUS AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to windshield wipers and, more particularly, to a self-operating windshield wiping apparatus and associated method for providing users with a convenient means to remove precipitation and clean a window.

2. Prior Art

Since the invention of the umbrella, perhaps only one other apparatus has become indispensable on a rainy day, the windshield wiping. The first automobile models sporting windshield wipers as standard equipment rolled out in 1915. The first wipers were hand operated, which made them difficult to use on rutted, muddy roads. Some of the hand craned wipers also featured windshield defrosters. These were double bladed; a wiping swept the outside of the windshield and a felt lined squeegee swept the inside. The blades moved in tandem. The next advancement in windshield wipers was the use of vacuum wiping motors. Early vacuum wiping motors got very sluggish when the engine had to draw power to accelerate or go uphill, so by the mid 1950's automakers had largely switched to electric motors.

Windshield wipers are essential safety devices but they are subject to malfunction, particularly on older cars. In April of this year, a federal lawsuit was filed which claims the windshield wipers on millions of older General Motors Corp. vehicles are defective and that the automaker should have recalled 7.5 million trucks, vans and spot utility vehicles instead of 1.7 million vehicles. The lawsuit claims a federal investigation found that wiping problems have caused at least 11 crashes and 225,000 warranty claims. The lawsuit has not yet been settled but it serves to illustrate how important it is to have functional windshield wipers. As all motorists know, however, windshield wiping problems do sometimes occur in newer cars that result in dirty windshields and impaired vision. Usually, the problem is the result of worn blades that the owner of the vehicle has neglected to replace.

Accordingly, a need remains for a apparatus in order to overcome the above-noted shortcomings. The present invention satisfies such a need by providing a self-operating windshield wiping apparatus that is convenient and easy to use, lightweight yet durable in design, and intended to provide users with an effective means of conveniently removing precipitation from their windshield.

BRIEF SUMMARY OF THE INVENTION

In view of the foregoing background, it is therefore an object of the present invention to provide a self-operating windshield wiping apparatus for cleaning a window. These and other objects, features, and advantages of the invention are provided by a self-operating windshield wiping apparatus for cleaning a window. Such a self-operating windshield wiping apparatus preferably includes a portable housing having a cavity extending upwardly from an open bottom end thereof. The portable housing may further have a curvilinear guide track formed in an outermost wall thereof. A suction cup is eccentrically positioned within the cavity and partially extends outwardly from the open bottom end for removably securing the portable housing to a support surface.

The present invention further includes a handle rotatably mated to the portable housing and reciprocated along the curvilinear guide track, a rotating cam situated within the portable housing and mated to the handle, and a motor communicatively mated to the rotating cam. Such a motor causes the rotating cam to rotate along a circular travel path within the cavity. A wiper blade section is coupled to a distal end of the handle and simultaneously reciprocated with the handle along a first arcuate path as the rotating cam is revolved along the circular travel path.

In one embodiment, the handle preferably includes a pivot pin rotatably anchored to a top end of the portable housing, and a rectilinear segment rotatably mated to the pivot pin and radially extending away therefrom. Such a rectilinear segment terminates adjacent to the curvilinear guide track and has a rectilinear slot formed therein. The rectilinear slot is registered parallel to a longitudinal length of the rectilinear segment, and a curvilinear segment is integrally formed with the rectilinear segment. Such a curvilinear segment is preferably oriented along the curvilinear guide track such that the curvilinear segment reciprocates along the curvilinear guide track while the rectilinear segment remains inwardly spaced from the outermost wall of the portable housing.

In one embodiment, the rotating cam preferably includes a disc operably coupled to the motor and situated within the cavity, and a rectilinear cam shaft directly connected to the disc and registered orthogonally thereto. Such cam shaft extends upwardly from an outer perimeter of the disc and remains interfitted within the rectilinear slot. In this manner, rotation of the disc along the circular travel path causes the cam shaft to reciprocate within the rectilinear slot and thereby oscillate the curvilinear segment along the curvilinear guide track.

In one embodiment, the suction cup preferably includes a deformably resilient bladder having an open bottom edge disposed subjacent to the open bottom end of the portable housing. A first actuation arm is situated along the top end of the portable housing, and a coupling is intermediately mated to the first actuation arm and an apex of the bladder. In this manner, the first actuation arm is selectively biased along a second arcuate path defined exterior to the portable housing and thereby causes the coupling to downwardly urge the apex and release the suction cup from a pressurized state.

In one embodiment, the suction cup may further include a second actuation arm connected to the top end of the portable housing wherein the second actuation arm downwardly penetrates into the cavity. Such a second actuation arm is reciprocated along a rectilinear path oriented perpendicular to the longitudinal length of the handle and thereby displaces the outer surface of the bladder such that the suction cup is released from the pressurized state.

In one embodiment, the curvilinear guide track has a radius greater than a radius of the circular travel path.

In one embodiment, a proximal end of the wiper blade section remains equidistantly spaced exterior of the curvilinear guide track as the rotatable cam is rotated along the circular travel path.

The present further includes a method of utilizing a self-operating windshield wiping apparatus for cleaning a window. Such a method preferably includes the chronological steps of: providing a portable housing having a cavity extending upwardly from an open bottom end thereof wherein the portable housing has a curvilinear guide track formed in an outermost wall thereof; providing and eccentrically positioning a suction cup within the cavity such that the suction cup partially extends outwardly from the open bottom end; and providing and rotatably mating a handle to the portable housing.

The method may further include the chronological steps of: providing and situating a rotating cam within the portable housing by mating the rotating cam to the handle; providing and coupling a wiper blade section to a distal end of the handle; providing and communicatively mating a motor to the rotating cam; removably securing the portable housing to a support surface; rotating the rotating cam along a circular travel path within the cavity; and simultaneously reciprocating the wiper blade section and the handle along a first arcuate path as the rotating cam is revolved along the circular travel path such that the handle is reciprocated along the curvilinear guide track.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIGS. 4a and 4b are top plan views showing arcuate movement of the handle and wiper blade section as the internal components of the invention are operably manipulated; and FIGS. 5-7 are side, front and rear elevational views of the apparatus shown in FIG. 1, respectively.

Figure 1:
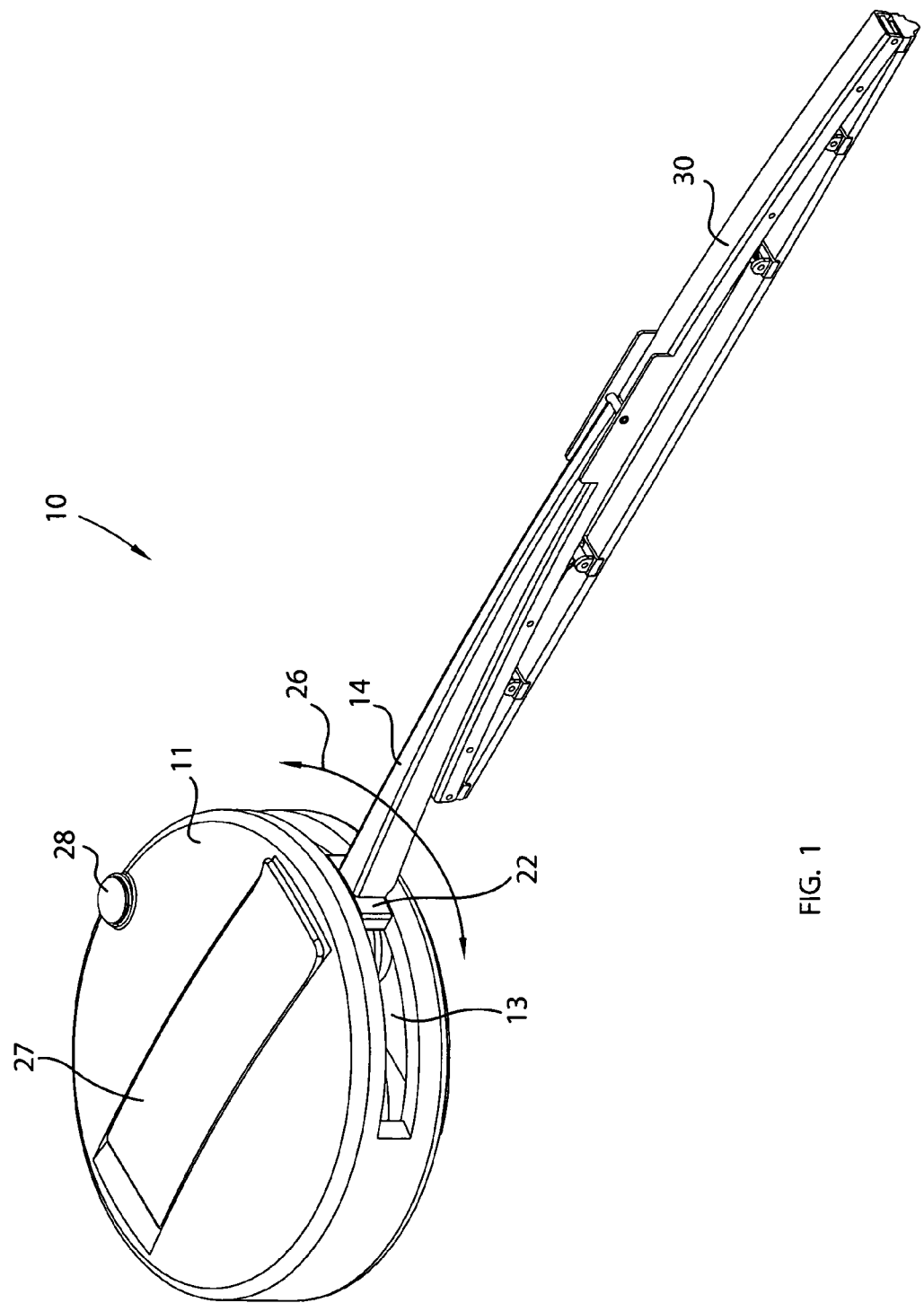
FIG. 1 is a perspective view showing a self-operating windshield wiping apparatus, in accordance with the present invention.
Figure 2:
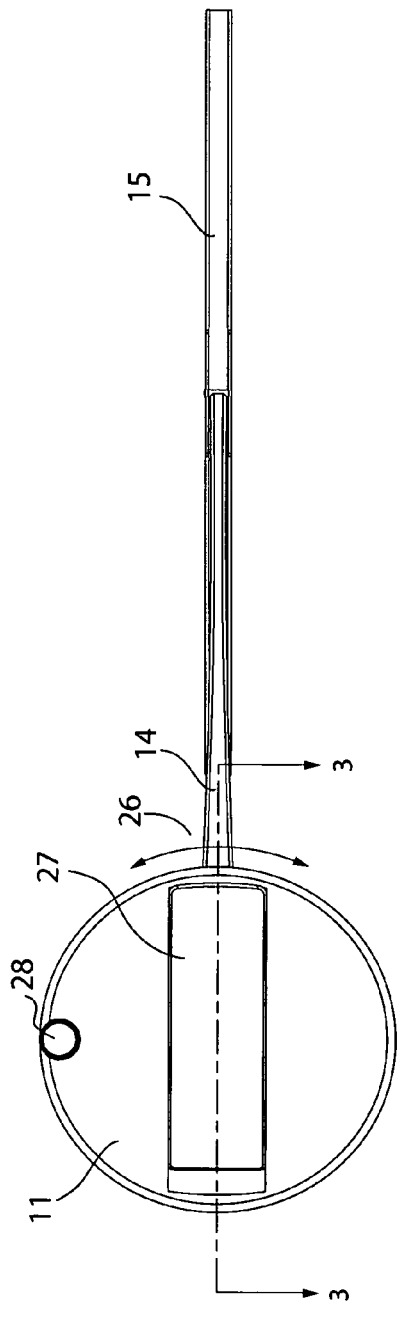
FIG. 2 is a top plan of the apparatus shown in FIG. 1.
Figure 3:
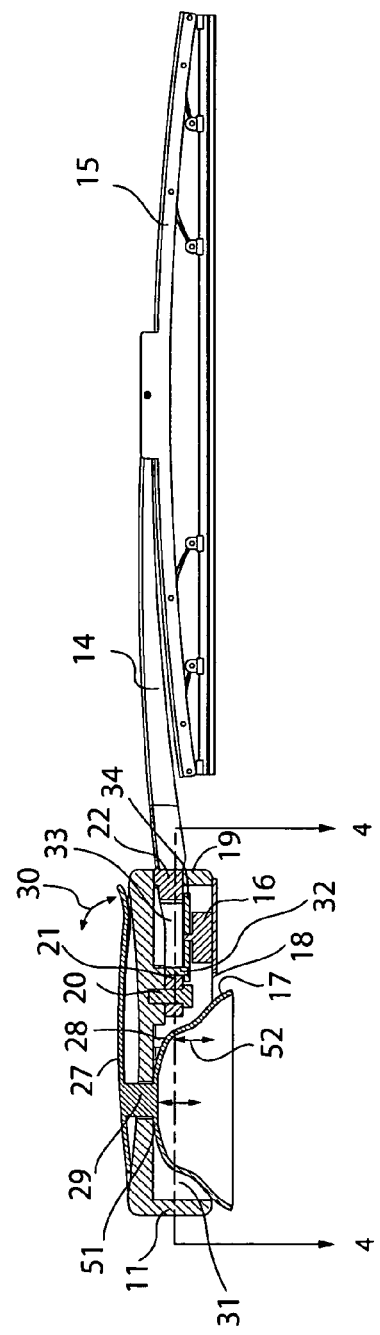
FIG. 3 is a cross-sectional view taken along line 3-3 in FIG. 2, showing the interrelationship between the major mechanical components of the apparatus.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus 10 of this invention is referred to generally in FIGS. 1-7 by reference numeral 10 and is intended to provide a self-operating windshield wiping apparatus 10 for cleaning a window. It should be understood that the self-operating windshield wiping apparatus 10 may be used to clean many different types of surfaces and should not be limited to cleaning only windows or windshields.

Referring to FIGS. 1-7, the self-operating windshield wiping apparatus 10 preferably includes a portable housing 11 having a cavity 31 extending upwardly from an open bottom end 18 thereof. The portable housing 11 may further have a curvilinear guide track 13 formed in an outermost wall 19 thereof. A suction cup 17 is eccentrically positioned within the cavity 31 and partially extends outwardly from the open bottom end 18 for removably securing the portable housing 11 to a support surface (not shown).

In one embodiment, the apparatus 10 may be compact in design with the approximate measurements of the housing 21 of a preferred embodiment being 3 inches in diameter, and 2⅓ inches deep. The apparatus 10 may be manufactured from a heavy-duty plastic material or any other such durable material as would be obvious to one skilled in the art. The housing 21 may be circular in shape with a suction cup 17 attached to one side.

Referring to FIGS. 2-4b, the present invention further includes a handle 14 rotatably mated to the portable housing 11 and reciprocated along the curvilinear guide track 13, a rotating cam 50 situated within the portable housing 11 and mated to the handle 14, and a motor 16 communicatively mated to the rotating cam 50. Such a motor 16 causes the rotating cam 50 to rotate along a circular travel path 25 within the cavity 31. A wiper blade section 15 is coupled to a distal end of the handle 14 and simultaneously reciprocated with the handle 14 along a first arcuate path 26 as the rotating cam 50 is revolved along the circular travel path 25.

Still referring to FIGS. 2-4b, the handle 14 preferably includes a pivot pin 20 rotatably anchored to a top end of the portable housing 11, and a rectilinear segment 21 rotatably mated to the pivot pin 20 and radially extending away therefrom. Such a rectilinear segment 21 terminates adjacent to the curvilinear guide track 13 and has a rectilinear slot 35 formed therein. In this manner, handle 14 rotates about pivot pin 20, defined by rotational path 23. The rectilinear slot 35 is registered parallel to a longitudinal length of the rectilinear segment 21, and a curvilinear segment 22 is integrally formed with the rectilinear segment 21. Such a curvilinear segment 22 is preferably oriented along the curvilinear guide track 13 such that the curvilinear segment 22 reciprocates along the curvilinear guide track 13 while the rectilinear segment 21 remains inwardly spaced from the outermost wall 19 of the portable housing 11. The combination of such claimed elements provides an unpredictable and unexpected benefit of ensuring handle 14 has sufficient leverage when rotating along curvilinear guide track 13, which solves the problem of insufficient torque to drive wiper section 15.

Referring to FIGS. 2-4b, the rotating cam 50 preferably includes a disc 34 operably coupled to the motor 16 and situated within the cavity 31, and a rectilinear cam shaft 32 directly connected to the disc 34 and registered orthogonally thereto. Such cam shaft 32 extends upwardly from an outer perimeter of the disc 34 and remains interfitted within the rectilinear slot 35. In this manner, rotation of the disc 34 along the circular travel path 25 causes the cam shaft 32 to reciprocate along linear path 33 within the rectilinear slot 35 and thereby oscillates the curvilinear segment 22 along the curvilinear guide track 13. Such reciprocation of the cam shaft 32 is radially oriented along direction 24. The combination of such claimed elements provides an unpredictable and unexpected benefit of ensuring handle 14 uniformly reciprocates along arcuate path 26, which solves the problem of undesirable movement away from the curvilinear guide track 13.

In one embodiment, the suction cup 17 preferably includes a deformably resilient bladder 17 having an open bottom edge disposed subjacent to the open bottom end 18 of the portable housing 11. A first actuation arm 27 is situated along the top end of the portable housing 11, and a coupling 29 is intermediately mated to the first actuation arm 27 and an apex 51 of the bladder 17. In this manner, the first actuation arm 27 is selectively biased along a second arcuate path 30 defined exterior to the portable housing 11 and thereby causes the coupling 29 to downwardly urge the apex 51 and release the suction cup 17 from a pressurized state. The combination of such claimed elements provides an unpredictable and unexpected benefit of permitting the user to quickly detach the suction cup 17 from the support surface, which solves the problem of having to forceful remove the suction cup 17 and damaging handle 14 and wiper blade section 15.

Referring to FIGS. 2-4b, the suction cup 17 may further include a second actuation arm 28 connected to the top end of the portable housing 11 wherein the second actuation arm 28 downwardly penetrates into the cavity 31. Such a second actuation arm 28 is reciprocated along a rectilinear path 52 oriented perpendicular to the longitudinal length of the handle 14 and thereby displaces the outer surface of the bladder 17 such that the suction cup 17 is released from the pressurized state.

Figure 4:
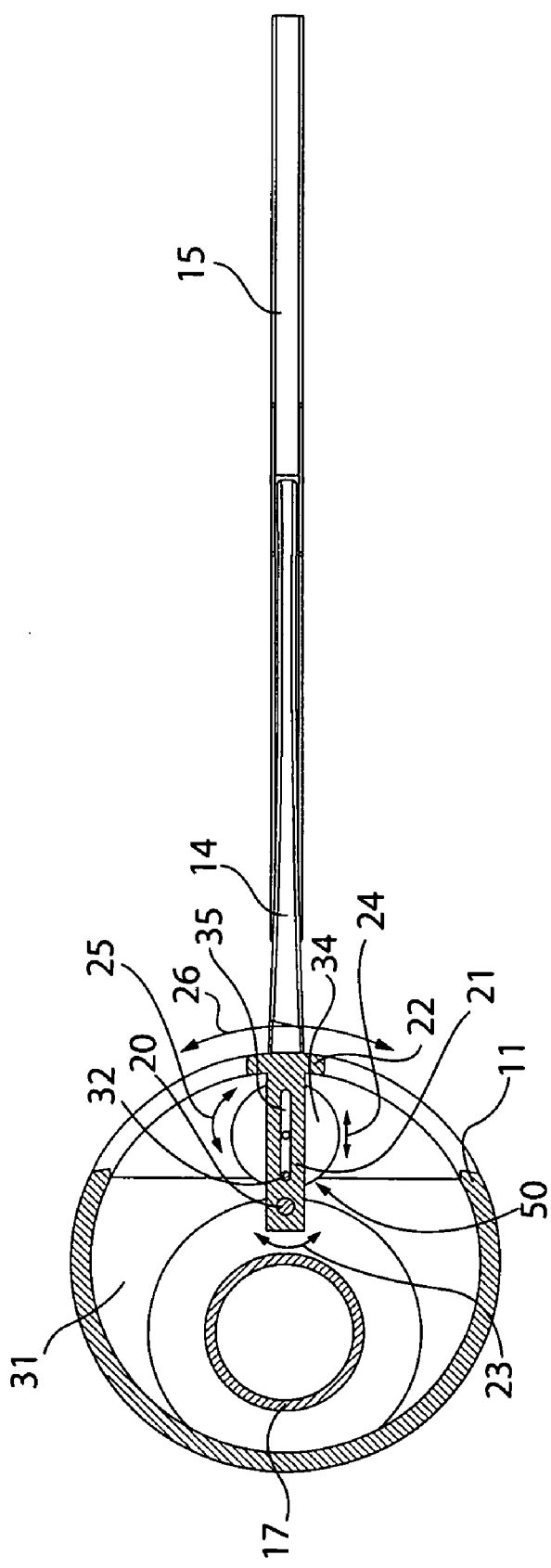
FIG. 4 is a cross-sectional view taken along line 4-4 in FIG. 3, showing the rectilinear and arcuate segments of the handle in relation to the curvilinear guide track.
Figure 4A:
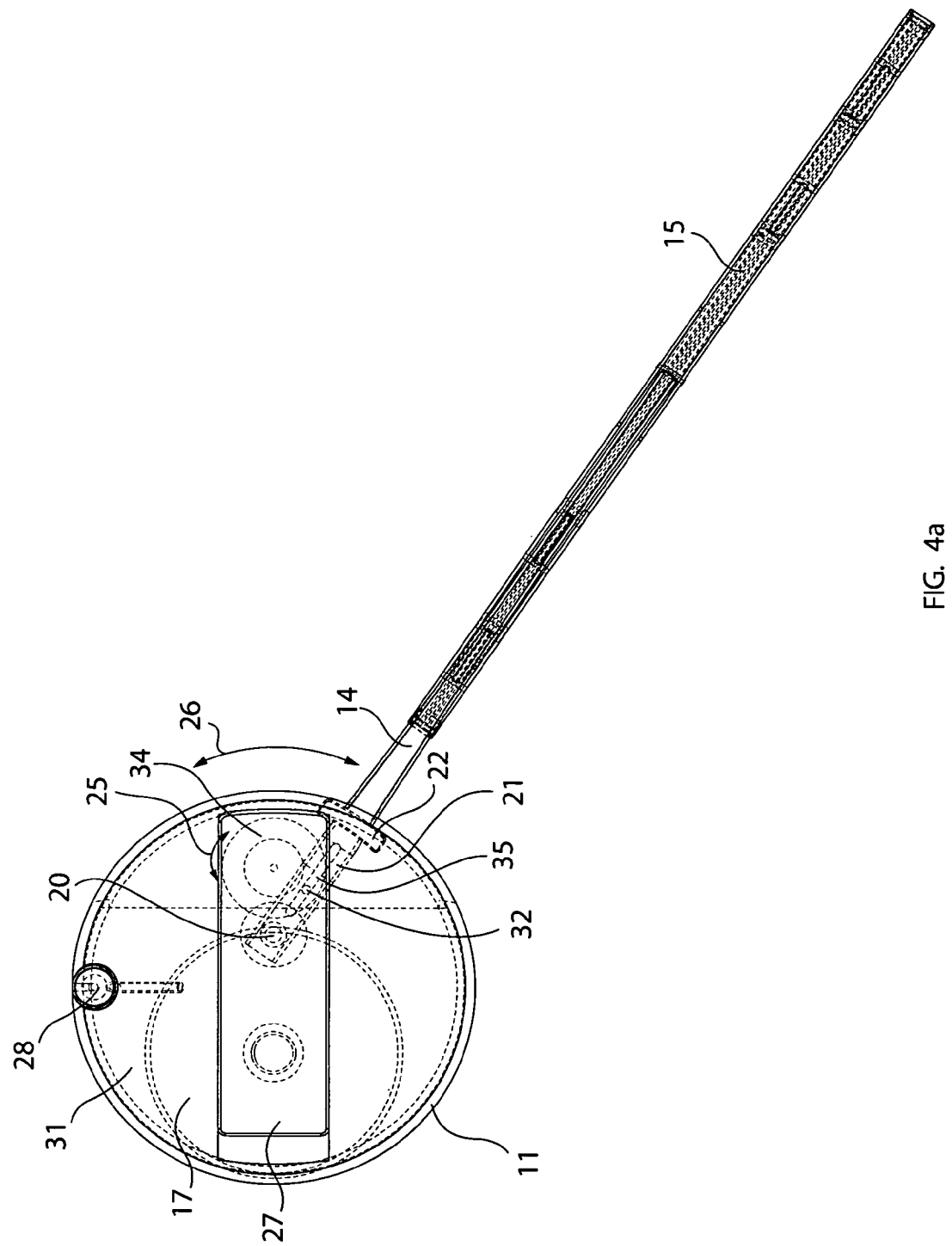

In one embodiment, the curvilinear guide track 13 has a radius greater than a radius of the circular travel path 25, as perhaps best shown in FIG. 4. The combination of such claimed elements provides an unpredictable and unexpected benefit of ensuring handle 14 can be quickly oscillated in alternating directions without accidentally snapping the handle 14 during extended use.

In one embodiment, a proximal end of the wiper blade section 15 remains equidistantly spaced exterior of the curvilinear guide track 13 as the rotatable cam is rotated along the circular travel path 25.

The present further includes a method of utilizing a self-operating windshield wiping apparatus 10 for cleaning a window. Such a method preferably includes the chronological steps of: providing a portable housing 11 having a cavity 31 extending upwardly from an open bottom end 18 thereof wherein the portable housing 11 has a curvilinear guide track 13 formed in an outermost wall 19 thereof; providing and eccentrically positioning a suction cup 17 within the cavity 31 such that the suction cup 17 partially extends outwardly from the open bottom end 18; and providing and rotatably mating a handle 14 to the portable housing 11.

The method may further include the chronological steps of: providing and situating a rotating cam 50 within the portable housing 11 by mating the rotating cam 50 to the handle 14; providing and coupling 29 a wiper blade section 15 to a distal end of the handle 14; providing and communicatively mating a motor 16 to the rotating cam 50; removably securing the portable housing 11 to a support surface (not shown); rotating the rotating cam 50 along a circular travel path 25 within the cavity 31; and simultaneously reciprocating the wiper blade section 15 and the handle 14 along a first arcuate path 26 as the rotating cam 50 is revolved along the circular travel path 25 such that the handle 14 is reciprocated along the curvilinear guide track 13.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A self-operating windshield wiping apparatus for cleaning a window, said self-operating windshield wiping apparatus comprising:
   a portable housing having a cavity extending upwardly from an open bottom end thereof, said portable housing further having a curvilinear guide track formed in an outermost wall thereof;
   a suction cup positioned within said cavity and extending outwardly from said open bottom end;
   a handle rotatably mated to said portable housing and reciprocated along said curvilinear guide track;
   a rotating cam situated within said portable housing and mated to said handle;
   a motor communicatively mated to said rotating cam and thereby causing said rotating cam to rotate along a circular travel path within said cavity; and
   a wiper blade section coupled to a distal end of said handle and reciprocated with said handle along a first arcuate path as said rotating cam is revolved along said circular travel path;
   wherein said handle comprises:
   a pivot pin rotatably anchored to a top end of said portable housing;
   a rectilinear segment rotatably mated to said pivot pin and radially extending away therefrom, said rectilinear segment terminating adjacent to said curvilinear guide track, said rectilinear segment having a rectilinear slot formed therein and registered parallel to a longitudinal length of said rectilinear segment; and
   a curvilinear segment integrally formed with said rectilinear segment, said curvilinear segment being oriented along said curvilinear guide track such that said curvilinear segment reciprocates along said curvilinear guide track while said rectilinear segment remains inwardly spaced from said outermost wall of said portable housing.

2. The self-operating windshield wiping apparatus of claim 1, wherein said rotating cam comprises:
- a disc operably coupled to said motor and situated within said cavity; and
- a rectilinear cam shaft directly connected to said disc and registered orthogonally thereto, said cam shaft extending upwardly from an outer perimeter of said disc and being interfitted within said rectilinear slot;
- wherein rotation of said disc along said circular travel path causes said cam shaft to reciprocate within said rectilinear slot and thereby oscillate said curvilinear segment along said curvilinear guide track.

3. The self-operating windshield wiping apparatus of claim 2, wherein said suction cup comprises:
- a deformably resilient bladder having an open bottom edge disposed subjacent to said open bottom end of said portable housing;
- a first actuation arm situated along said top end of said portable housing; and
- a coupling intermediately mated to said first actuation arm and an apex of said bladder;
- wherein said first actuation arm is selectively biased along a second arcuate path defined exterior to said portable housing and thereby causes said coupling to downwardly urge said apex and release said suction cup from a pressurized state.

4. The self-operating windshield wiping apparatus of claim 3, wherein said suction cup further comprises:
- a second actuation arm connected to said top end of said portable housing and downwardly penetrating into said cavity, said second actuation arm being reciprocated along a rectilinear path oriented perpendicular to said longitudinal length of said handle and thereby displacing said outer surface of said bladder such that said suction cup is released from the pressurized state.

5. The self-operating windshield wiping apparatus of claim 4, wherein said curvilinear guide track has a radius greater than a radius of said circular travel path.

6. The self-operating windshield wiping apparatus of claim 1, wherein a proximal end of said wiper blade section remains equidistantly spaced exterior of said curvilinear guide track as said rotatable cam is rotated along said circular travel path.

7. A self-operating windshield wiping apparatus for cleaning a window, said self-operating windshield wiping apparatus comprising:
- a portable housing having a cavity extending upwardly from an open bottom end thereof, said portable housing further having a curvilinear guide track formed in an outermost wall thereof;
- a suction cup eccentrically positioned within said cavity and partially extending outwardly from said open bottom end for removably securing said portable housing to a support surface;
- a handle rotatably mated to said portable housing and reciprocated along said curvilinear guide track;
- a rotating cam situated within said portable housing and mated to said handle;
- a motor communicatively mated to said rotating cam and thereby causing said rotating cam to rotate along a circular travel path within said cavity; and
- a wiper blade section coupled to a distal end of said handle and simultaneously reciprocated with said handle along a first arcuate path as said rotating cam is revolved along said circular travel path;
- wherein said handle comprises:
  - a pivot pin rotatably anchored to a top end of said portable housing;
  - a rectilinear segment rotatably mated to said pivot pin and radially extending away therefrom, said rectilinear segment terminating adjacent to said curvilinear guide track, said rectilinear segment having a rectilinear slot formed therein and registered parallel to a longitudinal length of said rectilinear segment; and
  - a curvilinear segment integrally formed with said rectilinear segment, said curvilinear segment being oriented along said curvilinear guide track such that said curvilinear segment reciprocates along said curvilinear guide track while said rectilinear segment remains inwardly spaced from said outermost wall of said portable housing.

8. The self-operating windshield wiping apparatus of claim 7, wherein said rotating cam comprises:
- a disc operably coupled to said motor and situated within said cavity; and
- a rectilinear cam shaft directly connected to said disc and registered orthogonally thereto, said cam shaft extending upwardly from an outer perimeter of said disc and being interfitted within said rectilinear slot;
- wherein rotation of said disc along said circular travel path causes said cam shaft to reciprocate within said rectilinear slot and thereby oscillate said curvilinear segment along said curvilinear guide track.

9. The self-operating windshield wiping apparatus of claim 8, wherein said suction cup comprises:
- a deformably resilient bladder having an open bottom edge disposed subjacent to said open bottom end of said portable housing;
- a first actuation arm situated along said top end of said portable housing; and
- a coupling intermediately mated to said first actuation arm and an apex of said bladder;
- wherein said first actuation arm is selectively biased along a second arcuate path defined exterior to said portable housing and thereby causes said coupling to downwardly urge said apex and release said suction cup from a pressurized state.

10. The self-operating windshield wiping apparatus of claim 9, wherein said suction cup further comprises:
- a second actuation arm connected to said top end of said portable housing and downwardly penetrating into said cavity, said second actuation arm being reciprocated along a rectilinear path oriented perpendicular to said longitudinal length of said handle and thereby displacing said outer surface of said bladder such that said suction cup is released from the pressurized state.

11. The self-operating windshield wiping apparatus of claim 10, wherein said curvilinear guide track has a radius greater than a radius of said circular travel path.

12. The self-operating windshield wiping apparatus of claim 7, wherein a proximal end of said wiper blade section remains equidistantly spaced exterior of said curvilinear guide track as said rotatable cam is rotated along said circular travel path.

* * * * *